United States Patent [19]

Hamilton et al.

[11] Patent Number: 4,469,020
[45] Date of Patent: Sep. 4, 1984

[54] PRESSURE COOKING AND SMOKING APPARATUS

[76] Inventors: Daniel B. Hamilton, 430 Parker Loop, Dayton, Tex. 77535; James H. Hughes, Jr., 5011 Briar Grove, Liberty, Tex. 77575

[21] Appl. No.: 392,654

[22] Filed: Jun. 28, 1982

[51] Int. Cl.³ .............................................. A47J 37/04
[52] U.S. Cl. ....................................... 99/352; 99/393; 99/450; 99/467; 99/482
[58] Field of Search ................. 99/352, 467, 469, 470, 99/473, 474, 475, 476, 481, 482, 357, 450, 393; 426/314

[56] References Cited

U.S. PATENT DOCUMENTS

| | | | |
|---|---|---|---|
| 416,504 | 12/1889 | Schaefer | 99/473 |
| 2,060,992 | 11/1936 | Jackson | 99/346 |
| 2,123,040 | 7/1938 | Hanak | 99/352 |
| 2,266,131 | 12/1941 | Thon | 99/472 |
| 2,333,505 | 11/1943 | Allen | 426/314 |
| 2,851,941 | 9/1958 | Cogar | 99/481 |
| 3,019,720 | 2/1962 | Topper | 99/482 |
| 3,078,783 | 2/1963 | Lee | 99/352 |
| 3,805,686 | 4/1974 | West | 99/352 |
| 3,943,841 | 3/1976 | Huang | 99/352 |
| 4,130,052 | 12/1978 | Jackson | 99/352 |
| 4,228,730 | 10/1980 | Schindler | 99/352 |

Primary Examiner—Robert W. Jenkins
Attorney, Agent, or Firm—Neal J. Mosely

[57] ABSTRACT

An apparatus for cooking and smoking food products under pressure comprises a cooking enclosure with separate means for heating and for supplying smoke under pressure. More particularly the apparatus comprises an enclosure with a removable door and a food tray which slides in and out of the opened door. An internal heat tube is provided for connection to an external heat source. A system for producing, filtering, drying, and compressing smoke introduces compressed dry smoke which pressurizes the enclosure. There is also provided a method of maintaining a relatively constant pressure inside the enclosure, and means for indicating temperature and pressure inside the enclosure.

20 Claims, 5 Drawing Figures

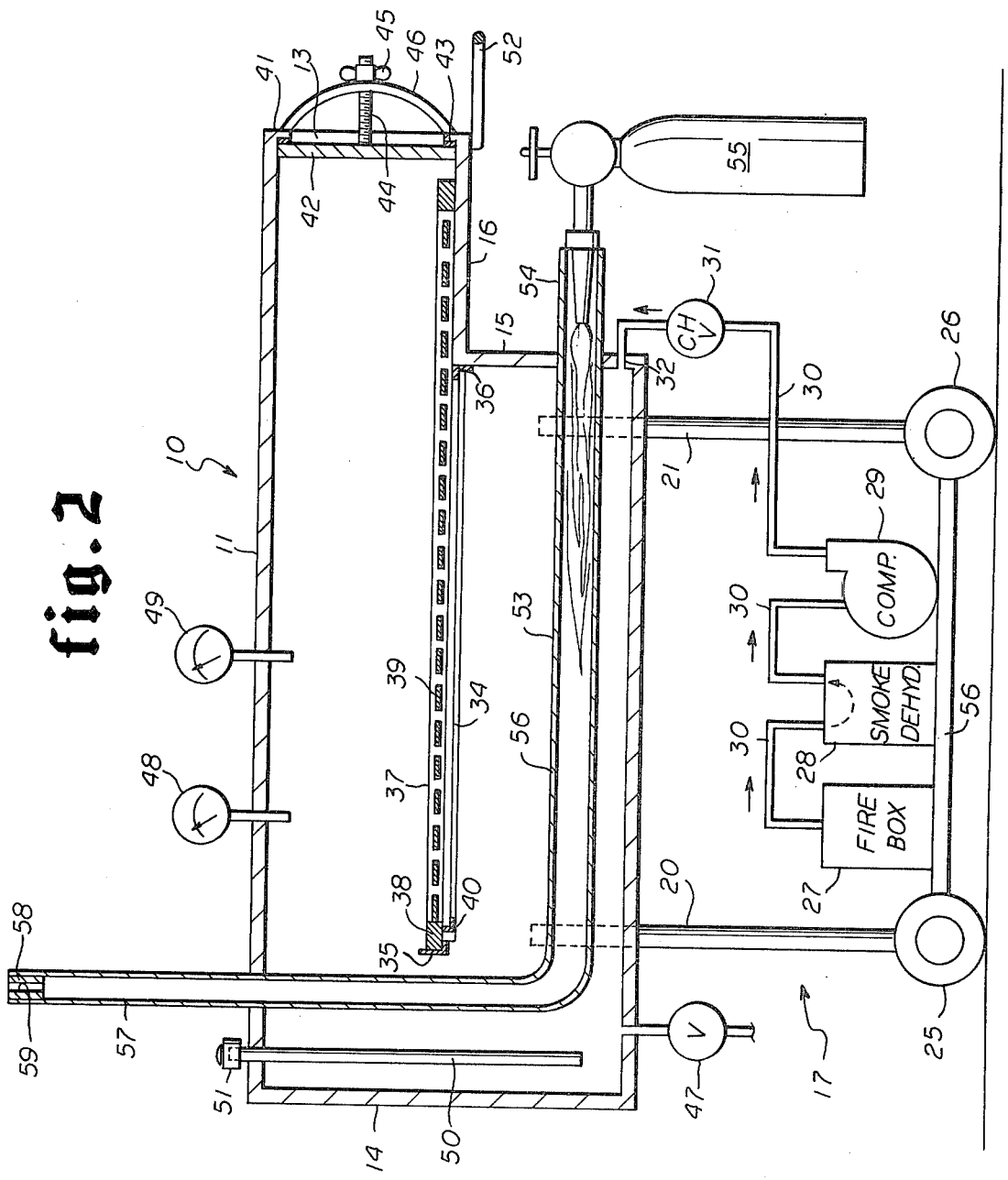

PRESSURE COOKING AND SMOKING APPARATUS

BACKGROUND OF THE INVENTION

This invention relates to an apparatus for cooking and smoking foods and more particularly to a novel construction and means for providing heat and compressed dry smoke to pressure cook and impart a smoked flavor to food products.

BRIEF DESCRIPTION OF THE PRIOR ART

The smoking of meat and food products is well known in the art. Likewise, pressure cooking is a well known practice. There are several patents which illustrate various methods and types of apparatus for cooking and smoking food products.

Jackson, U.S. Pat. No. 2,060,992 discloses a combination cooker and smoker apparatus. The apparatus is steam heated and is for simultaneous cooking and smoking of hot dogs and the like. The apparatus provides moist smoke and has no provision for separate control of the cooking and smoke generating means.

Hanack, U.S. Pat. No. 2,123,040 discloses a slow cooking and smoking apparatus for hams. There is no separate control of the cooking and smoking functions.

Thon, U.S. Pat. No. 2,266,131 discloses a cooking and smoking apparatus for meats. The apparatus provides for cooking the meat and then evacuating the chamber before the smoke is added.

Allen, U.S. Pat. No. 2,333,505 discloses an apparatus for smoking spices in trays under pressure to effect a smoke coating on the spices. The smoke is generated within the cooking vessel and cannot be controlled separately from the cooking function.

Lee, U.S. Pat. No. 3,078,783 discloses a pressure cooker having an externally heated member which extends inside the cooker which can be heated to pyrolize a flavoring element to generate smoke. The smoke is generated within the cooker and is not separately controlled.

Jackson, U.S. Pat. No. 4,130,052 shows a combination smoker and pressure cooker. The smoke is generated by a separately heated element inside the cooker.

None of these patents discloses the present invention which has a separate heating element, heat source, and smoke producing means and which cooks and smokes food products under pressure by the introduction of dry compressed smoke and heat separately into the cooking chamber. Furthermore, none of the patents disclose an arrangement of a food tray, pressure sealing door, and heating tube, or an arrangement for producing filtered dry compressed smoke.

SUMMARY OF THE INVENTION

It is therefore an object of the present invention to provide an apparatus for greatly reducing the time required to cook and smoke food products.

Another object of the present invention is to provide an apparatus for reducing the amount of shrinkage of food products.

Another object of the present invention is to provide an apparatus for producing tender food products.

A further object of the present invention is to provide an apparatus for imparting a smoked flavor to food products.

Still another object is to provide an apparatus having a cooking enclosure with separate means for introducing dry smoke under pressure and a heating fluid which can be separately controlled.

Other objects of the invention will be apparent from time to time throughout the specification and claims as hereinafter related.

These and other objects of the present invention are accomplished in one preferred embodiment which provides an apparatus for cooking and smoking food products under pressure comprising a cooking enclosure with separate means for heating and for supplying smoke under pressure.

More particularly the apparatus comprises an enclosure with a removable door and a food tray which slides in and out of the opened door. An internal heat tube is provided for connection to an external heat source.

A system for producing, filtering, drying, and compressing smoke introduces compressed dry smoke which pressurizes the enclosure. There is also provided a method of maintaining a relatively constant pressure inside the enclosure, and means for indicating temperature and pressure inside the enclosure.

BRIEF DESCRIPTION OF THE DRAWINGS

FIG. 2 is a cross sectional view of the present invention taken along lines 2—2 of FIG. 1, showing the removable parts in place.

FIG. 3 is a cross sectional view of the present invention taken along lines 3—3 of FIG. 1.

DESCRIPTION OF THE PREFERRED EMBODIMENT

Figure 1:
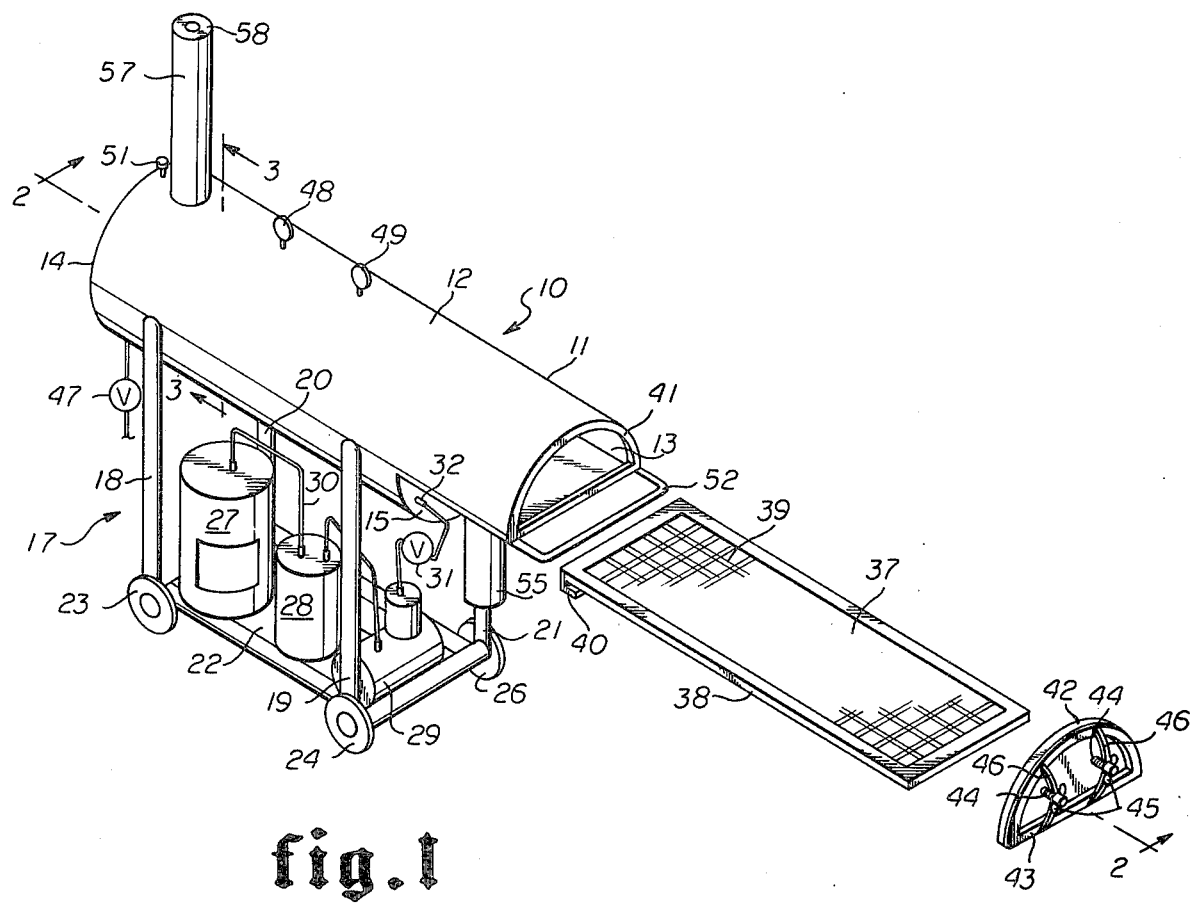
FIG. 1 is a perspective view of a preferred embodiment of the pressure cooking and smoking apparatus.

Referring to the drawings by numerals of reference, and more particularly to FIGS. 1, 2, and 3, there is shown a preferred pressure cooking and smoking apparatus 10. Apparatus 10 comprises a generally cylindrical enclosure 11 having a semi-cylindrical end portion 12 with a semi-circular opening 13 at one end. A circular back wall 14 closes the opposite end of the apparatus. A semi-circular wall 15 closes the end of the apparatus at a point spaced a short distance from the open end 13. A flat horizontal wall 16 extends between the open end 13 and the semi-circular wall 15. A handle 52 is mounted underneath horizontal member 16 and extends outwardly therefrom to provide easy portability and handling.

Enclosure 11 is mounted on a base generally designated 17. The base 17 comprises four vertical support members 18, 19, 20, and 21. A horizontal platform 22 is attached by conventional means to the bottom of the vertical support members. Wheels 23, 24, 25, and 26 are attached by conventional means to the bottom of the vertical support members 18–21. Horizontal platform 22 provides support for a firebox 27, a smoke dehydrator 28, and a smoke compressor 29 which are connected in series to opening 32 in enclosure end wall 15 by a high pressure hose or tubing 30. A check valve 31 is installed in the line between the compressor 29 and the enclosure 11.

Support members 33 and 34, in the form of angle irons, are mounted on the inside of the enclosure 11 on the horizontal wall member 16 and extend toward the back wall 14. A back stop member 35 is positioned at the back end of support members 33 and 34 and extends therebetween. A front catch memeber 36 is positioned on the interior surface of wall 15. As is seen in the drawings, members 33, 34, 35, and 36 are generally angular in cross section and are situated to form a rectangular ledge and guide for slidably receiving and supporting a food tray 37.

Food tray 37 comprises an open rectangular frame 38 and a grate member 39. A rear catch member 40 extends downwardly from the back end of frame 38. Food tray 37 is inserted through open semi-circular end 14 and moved rearwardly until the back end of frame 38 abuts back stop 35. In this position, food tray 37 is supported on members 16, 33, 46, 35, and 36. When desired, the food tray 37 can be pulled forward through the open end 14 until the rear catch member 40 mates with the front catch member 36. In this position food tray 37 extends outward from open end 14 and is supported on horizontal member 16 and prevented from falling by the mating of catch members 40 and 36.

The open end 14 of enclosure 11 contains a semi-circular flange 41 which surrounds the internal periphery of the opening and forms a supporting and sealing surface thereon. A semi-circular door 42 is provided which is the same general configuration as the opening 14 and has outside dimensions which are larger then the flange 41. Door 42 is releasably mounted in the open end 14.

Door 42 has a seal 43 attached on the outer surface thereof which has essentially the same size, shape, and configuration as flange 41. Seal 43 is composed of rubber or other suitable heat resistant pressure sealing material. Two threaded support members 44 and wing nuts 45 are attached to door 42. Two arcuate clamping members 46 are adjustably mounted on threaded members 44. The arcuate members 46 are constructed so that when they are vertical their ends will bear upon the outside of flange 41.

The door 42 is inserted in the following manner. The door 42 is held horizontally and turned sideways then inserted through the open end 14 and flange 41. Then it is tilted up into the position where the seal 43 is aligned with the inside surface of the flange 41. The arcuate clamp members 46 are placed in a vertical position where their ends are on the outside surface of flange 41 and then the wing nuts 45 are tightened sufficiently to compress seal 43 between door 42 and flange 41 to form a pressure tight seal. To remove the door 42, the wing nuts 45 are loosened. Then, the arcuate clamp members 46 are turned to clear the flange 41. Door 42 is then laid back horizontally, rotated 90 degrees and removed through the open end 14.

A drain valve 47 (shown schematically) is located on the bottom of enclosure 11 near the back wall 14. A temperature gauge 48 and a pressure gauge 49 ia mounted approximately mid way between the open end 14 and the back wall 14 of enclosure 11. A pressure relief tube 50 extends downwardly from the top surface of enclosure 11, adjacent to back wall 14, for a distance approximately three fourths of the vertical diameter of enclosure 11. The top portion of pressure tube 50 extends slightly above the top of enclosure 11.

A pressure control weight 51 rests on the top end of pressure tube 50 sealing the top end. The inside diameter of the pressure control weight 51 is larger than the outside diameter of the pressure tube 50 so that the pressure may be allowed to pass between the two diameters. Should the pressure inside the enclosure 11 exceed the desired pressure, then the pressure inside the enclosure 11 will momentarily lift the weight 51 off the top of the pressure tube 50 until the excess pressure escapes and then the weight 51 will drop back down and seal the top end of of pressure tube 50, thus maintaining a relatively constant pressure inside enclosure 11. Locating the bottom end of pressure tube 50 near the bottom of enclosure 11 maintains the level of smoke down to the opening in the tube and prevents a great loss of smoke when the pressure is momentarily relieved.

A heat tube 53 is located near the bottom of enclosure 11 and passing through semi-circular wall 15. Heat tube 53 has an outwardly extending portion 54 which is adapted to receive a heat source 55 such as a propane torch. Another portion 56 extends horizontally inside the enclosure 11 a distance sufficient to clear the back stop member 35 and then a vertical portion 57 curves upward and passes through the top of enclosure 11. The upwardly extending vertical portion 57 of heat tube 53 contains a draft restrictor 58 having a reduced bore 59 which reduces the chimney effect and prevents the flame from blowing out. This arrangement prevents the heat from escaping too fast and allows more efficient radiant heating.

Figure 4:
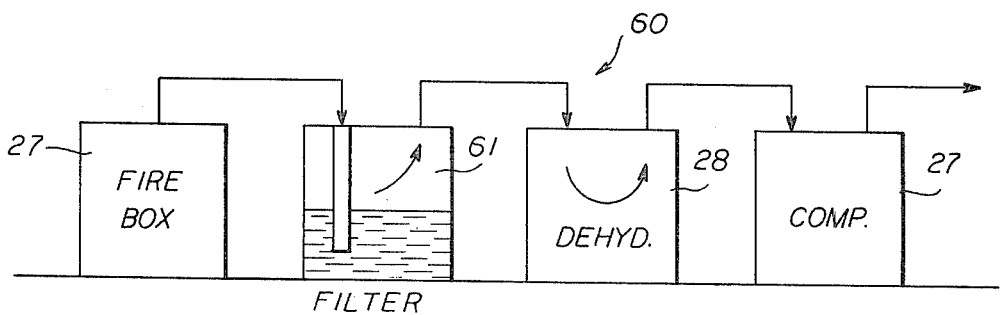
FIG. 4 is a schematic representation of an alternate arrangement to supply smoke to the enclosure of the present invention.

FIG. 4 shows schematically an alternate embodiment of a smoke producing means 60 wherein a smoke filter 61 is placed in the line between the firebox 27 and the smoke dehydrator 43.

Figure 5:
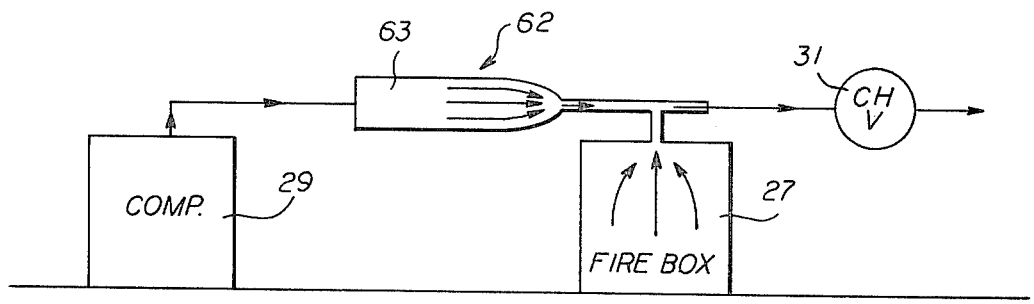
FIG. 5 is a schematic representation of another alternate arrangement to supply smoke to the enclosure of the present invention.

FIG. 5 shows schematically another alternate embodiment of a smoke producing means 62 wherein the compressor 29 compresses air which then passes through a venturi 63 which pulls the smoke from firebox 27 and forces the compressed smoke through check valve 31 and into the enclosure 11.

OPERATION

In operation, door 42 is removed as previously described and the food tray 37 is pulled out of the open end 14 for easy access. Food, e.g. meat, which is to be cooked and smoked, is placed on the food tray 37 and pushed back into the enclosure 11. Door 42 is installed and wing nuts 45 are tightened to form a pressure seal.

The desired smoke producing materials are placed in the firebox 27 and a fire is built. As the smoke is produced, the compressor 29 is turned on thus pressuring the enclosure with a mixture of smoke and other gases (air). The desired pressure is maintained by means of the pressure control weight 51. The smoke is pulled from the firebox 27, through the smoke dehydrator 43 where the moisture is removed. the dry smoke then passes through the compressor 29 where it is compressed and forced through the check valve 31 and into the enclosure 11, thus pressuring the enclosure 11 with dry smoke.

Heat source 55, i.e. propane torch, is ignited and placed into the outwardly extending portion 54 of heat tube 53 thereby raising the temperature and pressure inside the enclosure 11. Pressuring the enclosure 11 with dry smoke and radiant heat greatly reduces the cooking time required by conventional methods. As a result of this process there is very little shrinkage and the meats processed by this method emerge with a delicious smoked flavor, retain more natural juices, and are more tender than those processed by conventional methods.

In the alternate embodiment shown in FIG. 4, the filter means 61 consists of passing the smoke from firebox 27 through a liquid solution such as water. It should be understood that additional desirous effects may be acheived by using another liquid such as wine or beer or adding flavoring elements to the liquid to impart certain flavors to the food products.

While this invention has been described fully and completely with special emphasis upon a few preferred embodiments, it should be understood that, within the scope of the appended claims, the invention may be practiced otherwise than as specifically set forth herein.

I claim:

1. An apparatus for cooking and smoking food products comprising;
    an enclosed vessel having a pressure sealable opening,
    a removable pressure sealable door for said opening,
    heating means for said vessel comprising a radiant heat tube positioned in and extending outside of said vessel for receiving a heating fluid,
    smoke producing means external to said vessel and separate from said heating means, and
    means for supplying smoke under pressure from said smoke producing means to said vessel.

2. An apparatus according to claim 1 in which
    said tube has an external opening for receiving a source of gaseous fuel and said heating fluid is a flame,
    said tube further having an outlet for discharge of combustion products.

3. An apparatus according to claim 2 in which
    said tube outlet includes means for restricting fluid flow to prevent said flame from being blown out.

4. An apparatus according to claim 1 in which
    said means for supplying smoke under pressure comprises a compressor connected to compress said smoke prior to introduction into said vessel.

5. An apparatus according to claim 4 including
    means for filtering said smoke.

6. An apparatus according to claim 5 including
    means for drying said smoke.

7. An apparatus according to claim 1 in which
    said means for supplying smoke under pressure comprises a compressor connected to compress air to be introduced into said vessel, and
    means for mixing smoke from said smoke producing means with the compressed air.

8. An apparatus according to claim 7 in which
    said smoke mixing means comprises a venturi having a side opening connected to said smoke producing means and one end opening connected to receive said compressed air and another end opening connected to said vessel.

9. An apparatus according to claim 1 in which
    said smoke producing means comprises a firebox for the burning of smoke producing materials.

10. An apparatus according to claim 1 including
    means for relieving pressure inside said vessel.

11. An apparatus according to claim 10 in which
    said pressure relieving means comprises a tubular member having a pressure control means at one end and having its other end located for minimum smoke loss when the pressure is revieved.

12. An apparatus according to claim 11 in which
    said tubular member comprises a tube having an open end inside said vessel near the bottom thereof and extending vertically through the top to a point outside said vessel, and
    said pressure control means comprising a weighted closure opened in response to a predetermined pressure in said vessel.

13. An apparatus according to claim 1 including
    a sliding and removable food tray for supporting food products.

14. An apparatus according to claim 1 including
    means for indicating temperature inside said vessel.

15. An apparatus according to claim 1 including
    means for indicating pressure inside said enclosure.

16. An apparatus according to claim 1 including
    a base having vertical support members each having one end connected to said vessel and having wheels connected to their other ends and a horizontal platform disposed therebetween for supporting said smoke producing means.

17. An apparatus according to claim 1 including
    a one way check valve connected between said smoke supplying means and said vessel.

18. An apparatus according to claim 1 including
    a drain valve connected to said vessel.

19. An apparatus for cooking and smoking food products comprising;
    an enclosed vessel having a pressure sealable opening
    a removable pressure sealable door for said opening,
    heating means for said vessel,
    smoke producing means external to said vessel and separate from said heating means, and
    means for supplying smoke under pressure from said smoke producing means to said vessel, comprising a compressor connected to compress said smoke prior to introduction into said vessel.

20. An apparatus for cooking and smoking food products comprising;
    an enclosed vessel having a pressure sealable opening,
    a removable pressure sealable door for said opening,
    heating means for said vessel,
    smoke producing means external to said vessel and separate from said heating means,
    means for supplying smoke under pressure from said smoke producing means to said vessel, comprising a compressor connected to compress air to be introduced into said vessel, and
    means for mixing smoke from said smoke producing means with the compressed air.

* * * * *